(12) United States Patent
Yi (10) Patent No.: US 7,945,100 B2
(45) Date of Patent: May 17, 2011

(54) APPARATUS AND METHOD FOR DETECTING SECURE DOCUMENT

(75) Inventor: Jong-Hyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 899 days.

(21) Appl. No.: 11/447,883

(22) Filed: Jun. 7, 2006

(65) Prior Publication Data

US 2006/0280353 A1    Dec. 14, 2006

(30) Foreign Application Priority Data

Jun. 8, 2005  (KR) ................ 10-2005-0048840

(51) Int. Cl.
*G06K 9/68* (2006.01)
(52) U.S. Cl. ...................................... 382/219
(58) Field of Classification Search .......... 382/199, 382/219, 220, 135, 216, 103, 218, 222; 358/1.14
See application file for complete search history.

(56) References Cited

U.S. PATENT DOCUMENTS

| | | | | |
|---|---|---|---|---|
| 3,343,450 A * | 9/1967 | Glaser et al. | ..... | 355/51 |
| 4,864,629 A * | 9/1989 | Deering | ..... | 382/216 |
| 5,227,871 A * | 7/1993 | Funada et al. | ..... | 358/500 |
| 5,731,880 A * | 3/1998 | Takaragi et al. | ..... | 358/296 |
| 6,091,844 A * | 7/2000 | Fujii et al. | ..... | 382/135 |
| 6,181,813 B1 * | 1/2001 | Fan et al. | ..... | 382/135 |
| 6,757,427 B1 * | 6/2004 | Hongu | ..... | 382/164 |
| 7,215,791 B2 * | 5/2007 | Krishnamachari | ..... | 382/165 |
| 7,259,878 B2 * | 8/2007 | Ishida et al. | ..... | 358/1.14 |

FOREIGN PATENT DOCUMENTS

| | | |
|---|---|---|
| JP | 06-062236 | 3/1994 |
| JP | 08-062235 | 3/1994 |
| JP | 06268859 | 9/1994 |
| JP | 07-160886 | 6/1995 |
| JP | 07-283936 | 10/1995 |
| JP | 09044673 | 2/1997 |
| JP | 09259275 | 3/1997 |
| JP | 11-252351 | 9/1999 |
| JP | 11316839 | 11/1999 |
| JP | 2000-184190 | 6/2000 |
| JP | 2004514329 | 5/2004 |
| JP | 2005-033244 | 2/2005 |
| JP | 2005-039620 | 2/2005 |

* cited by examiner

*Primary Examiner* — Brian P Werner
*Assistant Examiner* — Dennis Rosario
(74) *Attorney, Agent, or Firm* — Roylance, Abrams, Berdo and Goodman L.L.P.

(57) ABSTRACT

An apparatus and method for detecting a secure document is provided. The apparatus includes an image input unit which receives the image of a document; an edge image detecting unit which detects an edge image of the document having a predetermined size; a similarity checking unit which checks the similarity between the detected edge image and comparative edge images of secure documents which are previously stored; and a document attribute determining unit which determines whether the document is one of the secure documents according to the result of the similarity checking unit.

27 Claims, 11 Drawing Sheets

APPARATUS AND METHOD FOR DETECTING SECURE DOCUMENT

CROSS-REFERENCE TO RELATED PATENT APPLICATION

This application claims the benefit of Korean Patent Application No. 10-2005-0048840, filed on Jun. 8, 2005, in the Korean Intellectual Property Office, the entire disclosure of which is hereby incorporated by reference.

BACKGROUND OF THE INVENTION

1. Field of the Invention

The present invention relates to an apparatus and method for determining whether an image input through a scanner is a secure document (for example, paper money, etc.). More particularly, the present invention relates to an apparatus and method for determining whether a secure document exists or what kind of document is used in a short time.

2. Description of the Related Art

Conventional technology for preventing a secure document such as paper money from being copied uses a method of comparing various features (for example, a color and a specified pattern) of the secure document. Typically, techniques for preventing paper money from being copied extract a portion of the paper money as an input image, compare the main color of the input image with that of a predetermined pattern, and determine whether the input image is authentic paper money when the amount of the main color of the input image is substantially equal to the amount of the main color of the predetermined pattern.

The following procedures are performed in the conventional technology, to determine whether the input image includes the pattern of the paper money. First, a determination is made as to whether the pixels of the input image are included in a predefined color region and a binary bitmap composed of the pixels is made. Thereafter, a determination is made regarding the existence of a predefined image in the binary bitmap using a method such as correlation. If the predefined image exists in the binary bit map, a general image forming process stops.

A process of detecting a secure document must be performed in a limited amount of time. For example, when a sheet of paper money is produced, the detection of the paper money should be performed before the money is output. Conventional copy preventing technology detects a specific image of the input document which is likely to be identified and the image forming process stops or the output is blackened using a black toner after a portion of the input image is copied. If a process of detecting a partial image of the input image to be identified takes a long time, the effect of an image formation preventing function cannot be obtained. In order to solve this problem, a method of determining whether an input image is a secure document and outputting the image when the input image is not the secure document may be used. However, this process increases an image forming time.

Accordingly, there is a need for an improved system and method for determining whether an input image is a secure document and outputting the image when the input image is not the secure document.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method to detect a secure document, in which a quick determination can be made as to whether an input document is a secure document.

According to an aspect of exemplary embodiments of the present invention, an apparatus is provided to detect a secure document including an image input unit, an edge image detecting unit, a similarity checking unit, and a document attribute determining unit. The image input unit receives the image of a document. The edge image detecting unit detects an edge image of the document that has a predetermined size. The similarity checking unit checks the similarity between the detected edge image and comparative edge images of secure documents which have been previously stored. The document attribute determining unit determines whether the document is one of the secure documents according to the result of the similarity checking unit.

According to another aspect of exemplary embodiments of the present invention, a method of detecting a secure document is provided. The image of a document is received, an edge image of the document having a predetermined size is detected, the similarity between the detected edge image and comparative edge images of secure documents which are previously stored is checked, and a determination is made as to whether the document is one of the secure documents according to the similarity.

BRIEF DESCRIPTION OF THE DRAWINGS

The above and other exemplary objects, features and advantages of certain exemplary embodiments of the present invention will be more apparent from the following description taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
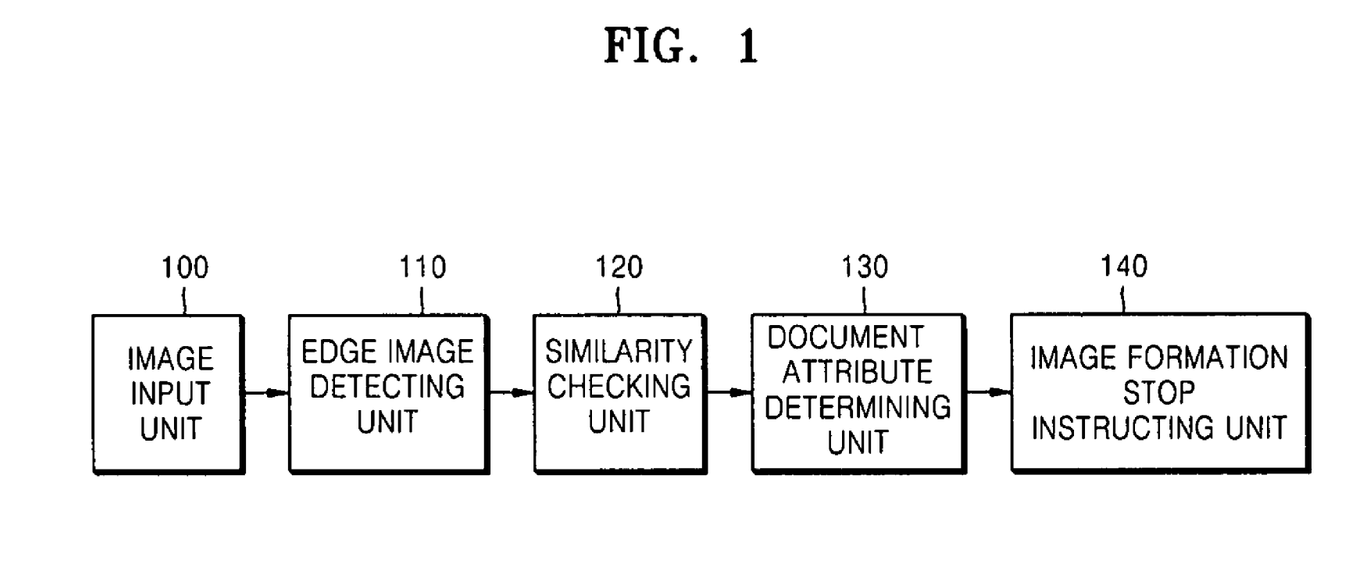
FIG. 1 is a block diagram of an apparatus for detecting a secure document according to an exemplary embodiment of the present invention.

FIG. 1 is a block diagram of an apparatus for detecting a secure document according to an exemplary embodiment of the present invention. The apparatus includes an image input unit 100, an edge image detecting unit 110, a similarity checking unit 120, a document attribute determining unit 130, and an image formation stop instructing unit 140.

In an exemplary embodiment of the present invention, the image formation of paper money is prevented when a secure document is paper money.

The image input unit 100 receives the image of a document.

Figure 2:
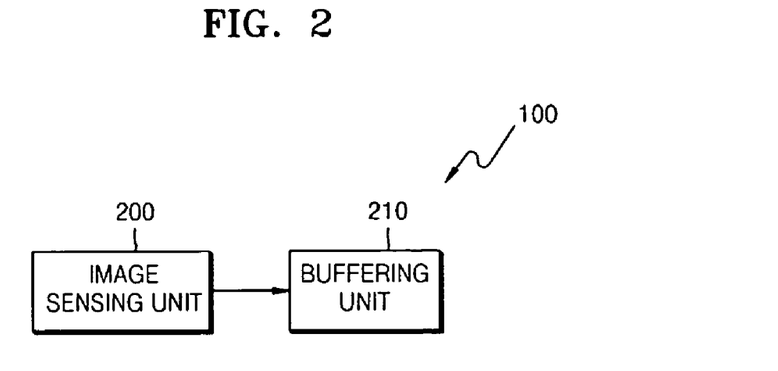
FIG. 2 is a block diagram of an image input unit illustrated in FIG. 1.

FIG. 2 is a block diagram of the image input unit 100 illustrated in FIG. 1. The image input unit 100 includes an image sensing unit 200 and a buffering unit 210.

The image sensing unit 200 senses the image of the document and outputs the sensed result to the buffering unit 210. The image sensing unit 200 may be a charge coupled device (CCD) image sensor or a complementary metal oxide semiconductor (CMOS) image sensor (also referred to as a contact image sensor (CIS)). The CCD image sensor converts light into an electric charge which produces voltage, and the CCD measures the voltage and produces a digital signal. The CMOS image sensor includes a converter (not shown) for converting charges into an electrical signal in every pixel and for amplifying a signal for every pixel.

The buffering unit 210 stores a predetermined number of lines of the image sensed by the image sensing unit 200 and outputs the image to the edge image detecting unit 110. The predetermined number of lines is the number of lines of an image including an edge image that can be detected by the edge image detecting unit 110. The edge image may need to have a predetermined size so that the edge detecting unit 110 can detect the edge image.

The edge image detecting unit 110 detects the edge image having the predetermined size from the image provided from the image input unit 100 and outputs the detected result to the similarity checking unit 120.

Figure 3:
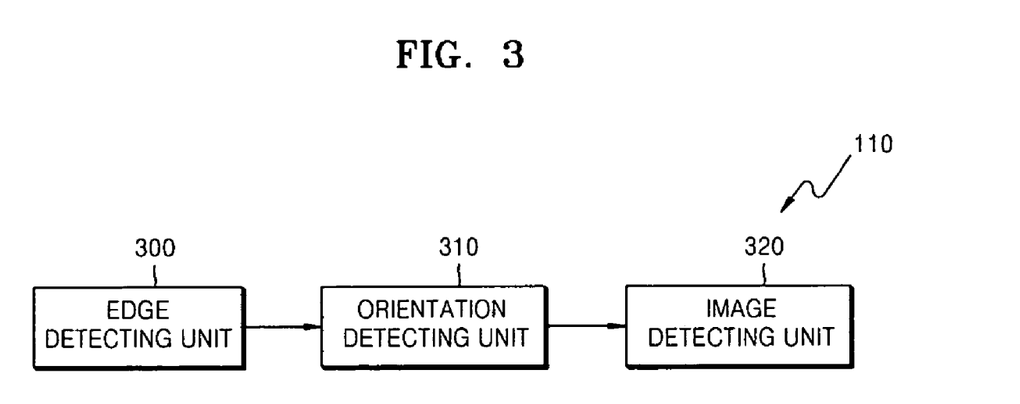
FIG. 3 is a block diagram of an edge image detecting unit illustrated in FIG. 1.

FIG. 3 is a block diagram of the edge image detecting unit 110 illustrated in FIG. 1. The edge image detecting unit 110 includes an edge detecting unit 300, an orientation detecting unit 310, and an image detecting unit 320.

The edge detecting unit 300 detects an edge of the document and outputs the detected result to the orientation detecting unit 310.

Figure 4:
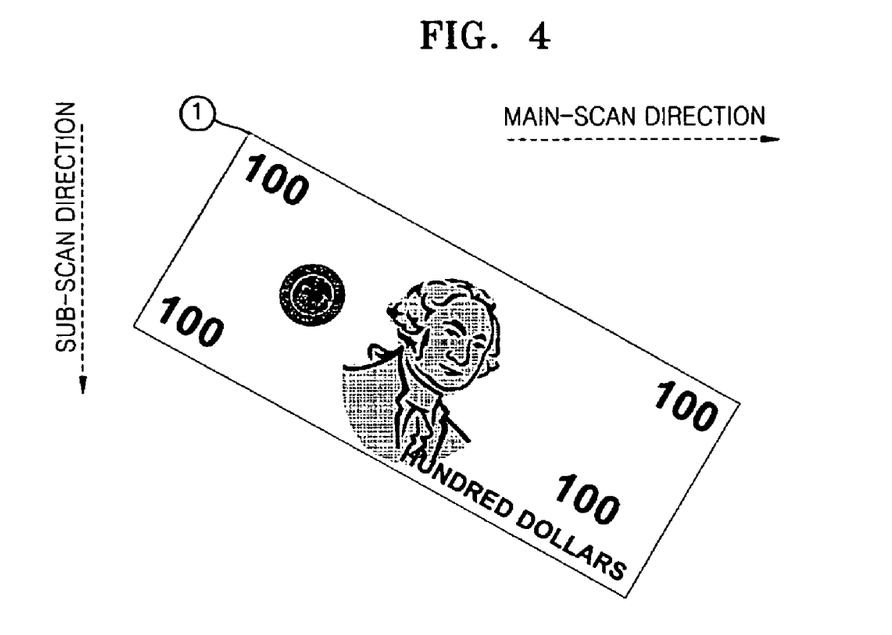
FIG. 4 illustrates a state in which paper money is put on a flat bed of an image forming apparatus.

FIG. 4 illustrates a state in which the paper money is put on a flat bed of an image forming apparatus.

Referring to FIG. 4, the edge detecting unit 300 detects an edge ① of the paper money from the input image when the image input unit 100 receives the image while moving in a sub-scan direction.

The orientation detecting unit 310 detects the orientation of the document from the image of the edge detected by the edge detecting unit 300 and outputs the detected result to the image detecting unit 320.

For example, the orientation of the paper money put on the flat bed can be calculated using the image of the input edge ① received from the image input unit 100.

The image detecting unit 320 detects an edge image having the predetermined size using the orientation detected by the orientation detecting unit 310 and outputs the detected result to the similarity checking unit 120.

Figure 5:
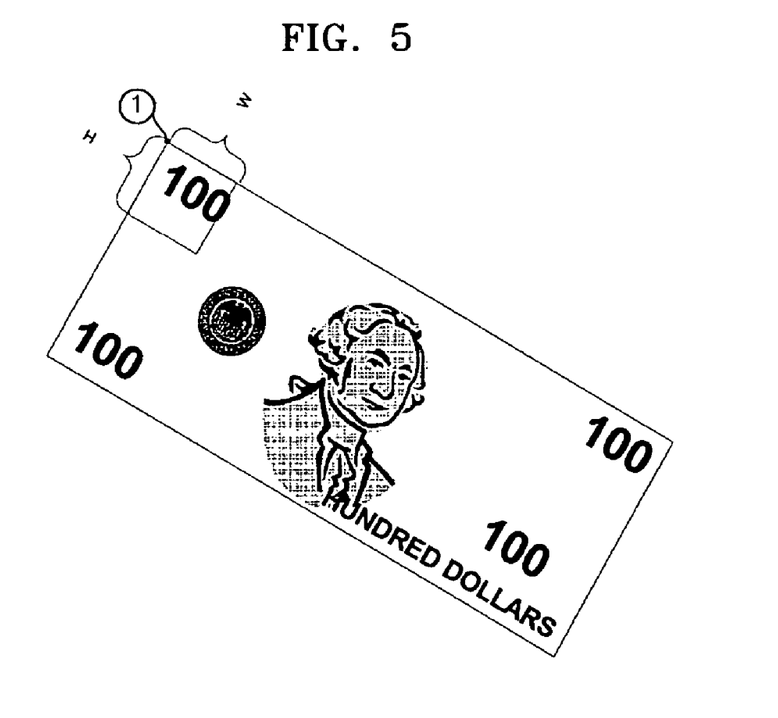
FIG. 5 illustrates an example of detecting the edge image of the paper money illustrated in FIG. 4.

FIG. 5 illustrates an example of detecting the edge image of the paper money illustrated in FIG. 4. Referring to FIG. 5, the image having the predetermined size, that is, W×H, in the image of the edge ① is detected by the image detecting unit 320.

The similarity checking unit 120 checks the similarity between the edge image detected by the edge image detecting unit 110 and comparative edge images of secure documents which are previously stored. The similarity checking unit 120 then outputs the result to the document attribute determining unit 130.

The sizes of the comparative edge images of the secure documents are equal to the predetermined size of the edge image detected by the edge image detecting unit 110.

Figure 6A:
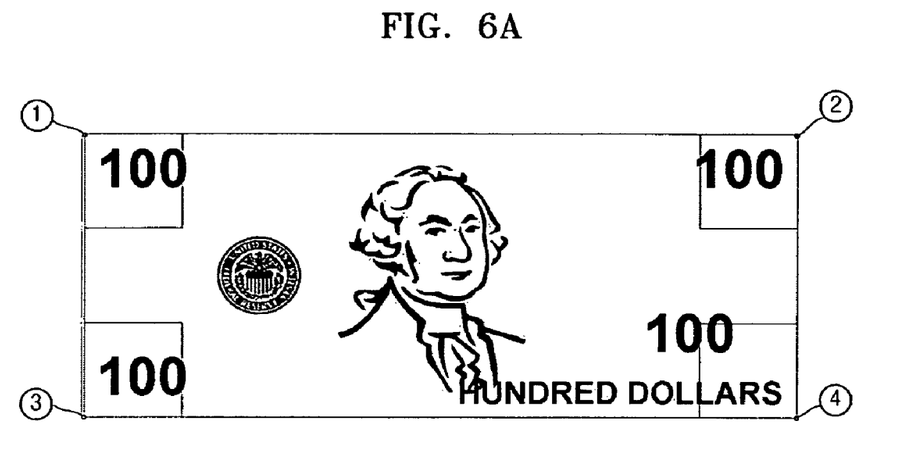
FIGS. 6A and 6B illustrate paper money as examples of the secure document.
Figure 6B:
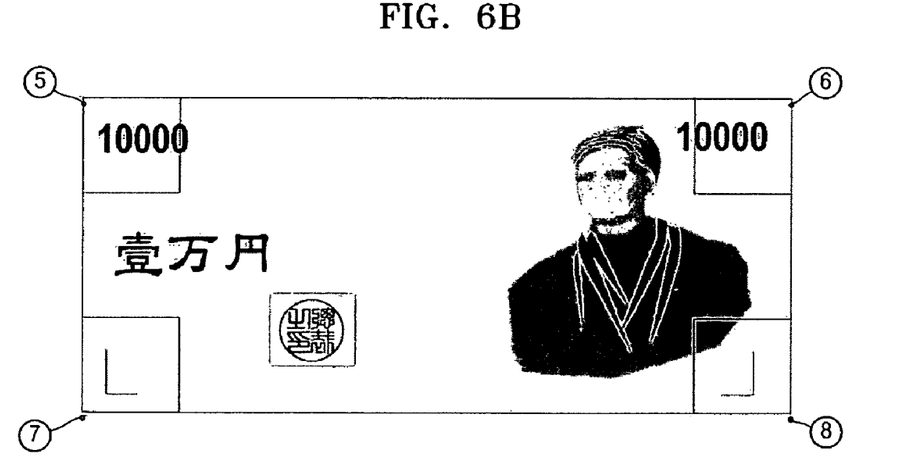

FIGS. 6A and 6B illustrate paper money as examples of the secure document. FIG. 6A illustrates paper money of the United States of America and FIG. 6B illustrates paper money of Japan.

Figure 7:
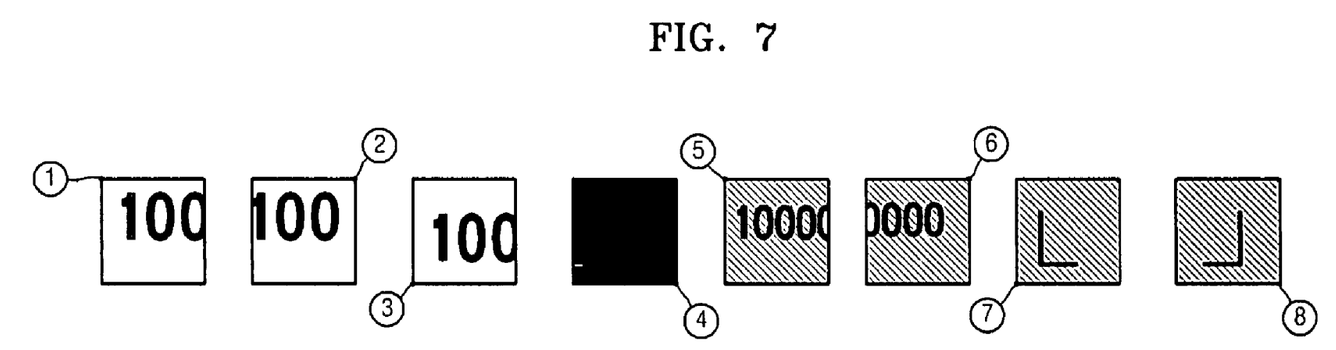
FIG. 7 illustrates examples of comparative edge images corresponding to edge images of the paper money illustrated in FIGS. 6A and 6B.

FIG. 7 illustrates examples of the comparative edge images of the paper money illustrated in FIGS. 6A and 6B. Referring to FIG. 7, the comparative edge images of the paper money that have the predetermined size are previously stored.

The comparative edge images are rearranged and stored with a predetermined orientation.

Figure 8:
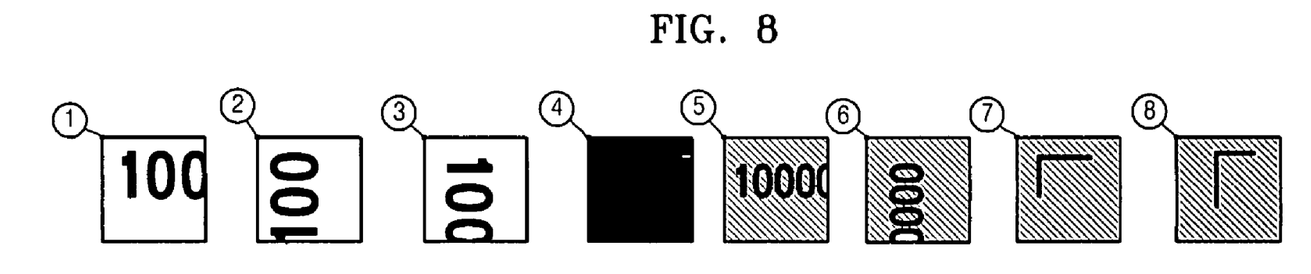
FIG. 8 is an example of the comparative edge images illustrated in FIG. 7 rearranged with a predetermined orientation.

FIG. 8 illustrates an example of the comparative edge images illustrated in FIG. 7 rearranged with a predetermined orientation. Referring to FIG. 8, the comparative edge images ① through ⑧ are rearranged with a predetermined orientation (for example, in an upper left direction). The rearranged comparative edge images are stored in the similarity checking unit 120.

Figure 9:
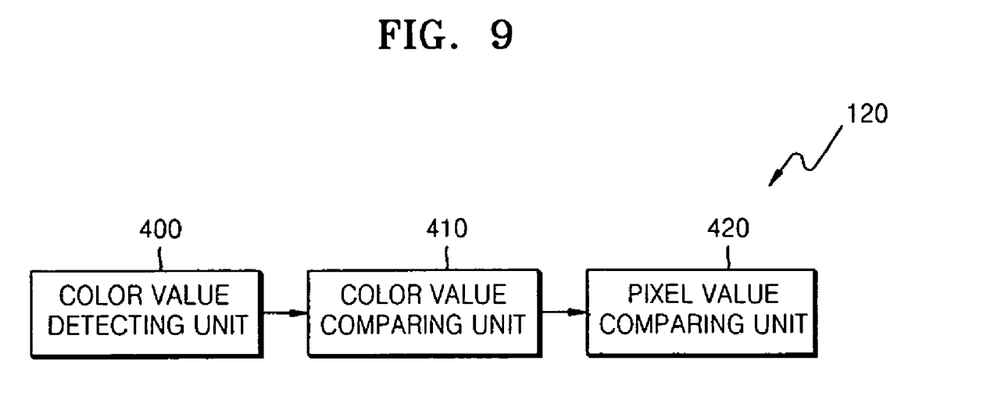
FIG. 9 is a block diagram of a similarity checking unit illustrated in FIG. 1.

FIG. 9 is a block diagram of the similarity checking unit 120 illustrated in FIG. 1. The similarity checking unit 120 includes a color value detecting unit 400, a color value comparing unit 410, and a pixel value comparing unit 420.

The color value detecting unit 400 detects representative color values of the edge image detected by the edge image detecting unit 110 and outputs the detected result to the color value comparing unit 410.

The color value detecting unit 400 detects a first red value obtained by averaging the red pixel values of the detected edge image, a first green value obtained by averaging the green pixel values of the detected edge image, and a first blue value obtained by averaging the blue pixel values of the detected edge image. The pixel values are detected as the representative color values.

Alternatively, the color value detecting unit 400 detects a second red, green, and blue value as the representative color values. The second red, green, and blue values occur with a maximum frequency among their respective pixel values of the detected edge image, as the representative color values.

Alternatively, the color value detecting unit 400 detects third red, green, and blue values corresponding to a median of their respective pixel values of the detected edge image as the representative color values.

The color value comparing unit 410 compares the representative color values of the edge image detected by the color value detecting unit 410 with the representative color values of the comparative edge images which are previously stored, respectively.

When receiving the first red value, the first green value, and the first blue value detected by the color value detecting unit 400, the color value comparing unit 410 obtains the absolute values of the respective differences between the first red, green, and blue values, and first comparative red, green, and blue values as representative color values of any one of the comparative edge images which are previously stored. The color value comparing unit 410 also compares the obtained absolute values with first, second, and third threshold values. The first comparative red value, the first comparative green value, and the first comparative blue value are obtained by averaging the respective pixel values of one of the comparative edge images which are previously stored.

For example, the first red, green, and blue values are respectively $R_1$, $G_1$, and $B_1$, the first comparative red, green, and blue values are respectively $R_{r1}$, $G_{r1}$, and $B_{r1}$, and the first, second, and third threshold values are respectively $Th_1$, $Th_2$, and $Th_3$. In this case, $|R_1-R_{r1}|$ and $Th_1$ are compared with each other, $|G_1-G_{r1}|$ and $Th_2$ are compared with each other, and $|B_1-B_{r1}|$ and $Th_3$ are compared with each other. If $|R_1-R_{r1}|$ is less than $Th_1$, $|G_1-G_{r1}|$ is less than $Th_2$, and $|B_1-B_{r1}|$ is less than $Th_3$, the color value comparing unit 410 determines that the detected edge image and one of the comparative edge images which is previously stored have similar representative color values.

Alternatively, the color value comparing unit 410 compares the sum of the absolute values of the respective differences between the first red, green, and blue values, and the first comparative red, green, and blue values, with a fourth threshold value.

For example, when the fourth value is $Th_4$, $|R_1-R_{r1}|+|G_1-G_{r1}|+|B_1-B_{r1}|$ and $Th_4$ are compared with each other. If $|R_1-R_{r1}|+|G_1-G_{r1}|+|B_1-B_{r1}|$ is less than $Th_4$, the color value comparing unit 410 determines that the detected edge image and one of the comparative edge images which is previously stored have similar representative color values.

When receiving the second red, green, and blue values detected by the color value detecting unit 400, the color value comparing unit 410 obtains the absolute values of the respective differences between the second red, green, and blue values and second comparative red, green, and blue values as representative color values of any one of the comparative edge images which are previously stored, and compares the obtained absolute values with fifth, sixth, and seventh threshold values. The second comparative red, green, and blue values are values occurring with maximum frequencies among the respective color values of the pixels of one of the comparative edge images which are previously stored.

For example, the second red, green, and blue values are respectively $R_2$, $G_2$, and $B_2$, the second comparative red, green, and blue values are respectively $R_{r2}$, $G_{r2}$, and $B_{r2}$, and the fifth, sixth, and seventh threshold values are respectively $Th_5$, $Th_6$, and $Th_7$. In this case, $|R_2-R_{r2}|$ and $Th_5$ are compared with each other, $|G_2-G_{r2}|$ and $Th_6$ are compared with each other, and $|B_2-B_{r2}|$ and $Th_7$ are compared with each other. If $|R_2-R_{r2}|$ is less than $Th_5$, $|G_2-G_{r2}|$ is less than $Th_6$, and $|B_2-B_{r2}|$ is less than $Th_7$, the color value comparing unit 410 determines that the detected edge image and one of the comparative edge images which is previously stored have similar representative color values.

Alternatively, the color value comparing unit 410 compares the sum of the absolute values of the respective differences between the second red, green, and blue values, and the second comparative red, green, and blue values with an eighth threshold value.

For example, when the eighth value is denoted by $Th_8$, $|R_2-R_{r2}|+|G_2-G_{r2}|+|B_2-B_{r2}|$ and $Th_8$ are compared with each other. If $|R_2-R_{r2}|+|G_2-G_{r2}|+|B_2-B_{r2}|$ is less than $Th_8$, the color value comparing unit 410 determines that the detected edge image and one of the comparative edge images which is previously stored have similar representative color values.

When receiving the third red, green, and blue values, detected by the color value detecting unit 400, the color value comparing unit 410 obtains the absolute values of the respective differences between the third red, green, and blue values, and third comparative red, green, and blue values as the representative color values of any one of the comparative edge images which are previously stored, and compares the obtained absolute values with ninth, tenth, and eleventh threshold values. The third comparative red, green, and blue values are median values among the respective color values of the pixels of one of the comparative edge images which is previously stored.

For example, the third red, green, and blue values are respectively $R_3$, $G_3$, and $B_3$, the third comparative red, green, and blue values are respectively $R_{r3}$, $G_{r3}$, and $B_{r3}$, and the ninth, tenth, and eleventh threshold values are respectively $Th_9$, $Th_{10}$, and $Th_{11}$. In this case, $<R_3-R_{r3}|$ and $Th_9$ are compared with each other, $|G_3-G_{r3}|$ and $Th_{10}$ are compared with each other, and $|B_3-B_{r3}|$ and $Th_{11}$ are compared with each other. If $|R_3-R_{r3}|$ is less than $Th_9$, $|G_3-G_{r3}|$ is less than $Th_{10}$, and $|B_3-B_{r3}|$ is less than $Th_{11}$, the color value comparing unit 410 determines that the detected edge image and one of the images which is previously stored have similar representative color values.

Alternatively, the color value comparing unit 410 compares the sum of the absolute values of the respective differences between the third red, green, and blue values, and the third comparative red, green, and blue values with a twelfth threshold value.

For example, the twelfth value is denoted by $Th_{12}$, $|R_3-R_{r3}|+|G_3-G_{r3}|+|B_3-B_{r3}|$ and $Th_{12}$ are compared with each other. If $|R_3-R_{r3}|+|G_3-G_{r3}|+|B_3-B_{r3}|$ is less than $Th_{12}$, the color value comparing unit 410 determines that the detected edge image and one of the comparative edge images which is previously stored have similar representative color values.

The color value comparing unit 410 detects the comparative edge images having representative color values similar to the detected representative color values and outputs the detected result to the pixel value comparing unit 420.

Figure 10:
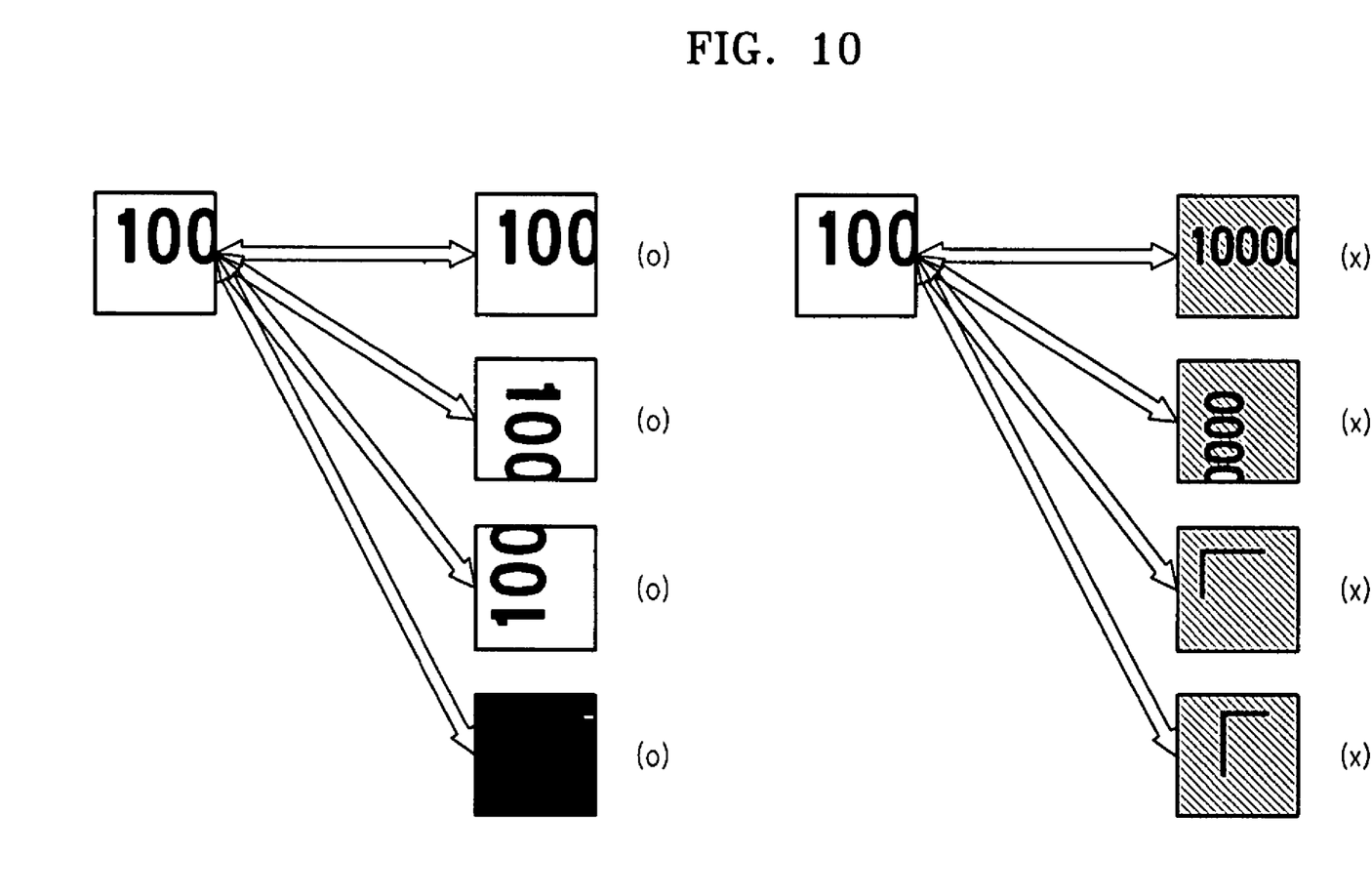
FIG. 10 illustrates examples of comparative edge images detected by a color value comparing unit illustrated in FIG. 9.

FIG. 10 illustrates examples of comparative edge images detected by a color value comparing unit 410 illustrated in FIG. 6. Referring to FIG. 10, the comparative edge images having representative color values similar to those of the edge image detected by the edge image detecting unit 110 are indicated by "o" and the comparative images having representative color values which are not similar to those of the detected edge image are indicated by "x".

The pixel value comparing unit 420 compares the color values of the pixels of the detected edge image with those of the comparative edge images selected by the color value comparing unit 410, and outputs the comparison result to the document attribute determining unit 130.

The pixel value comparing unit 420 compares the color values of the bitmap of the input comparative edge images with those of the detected edge image in the pixel unit when it receives the comparative edge images having the representative color values similar to those of the edge image detected by the edge image detecting unit 110 from the color value comparing unit 410.

Figure 11:
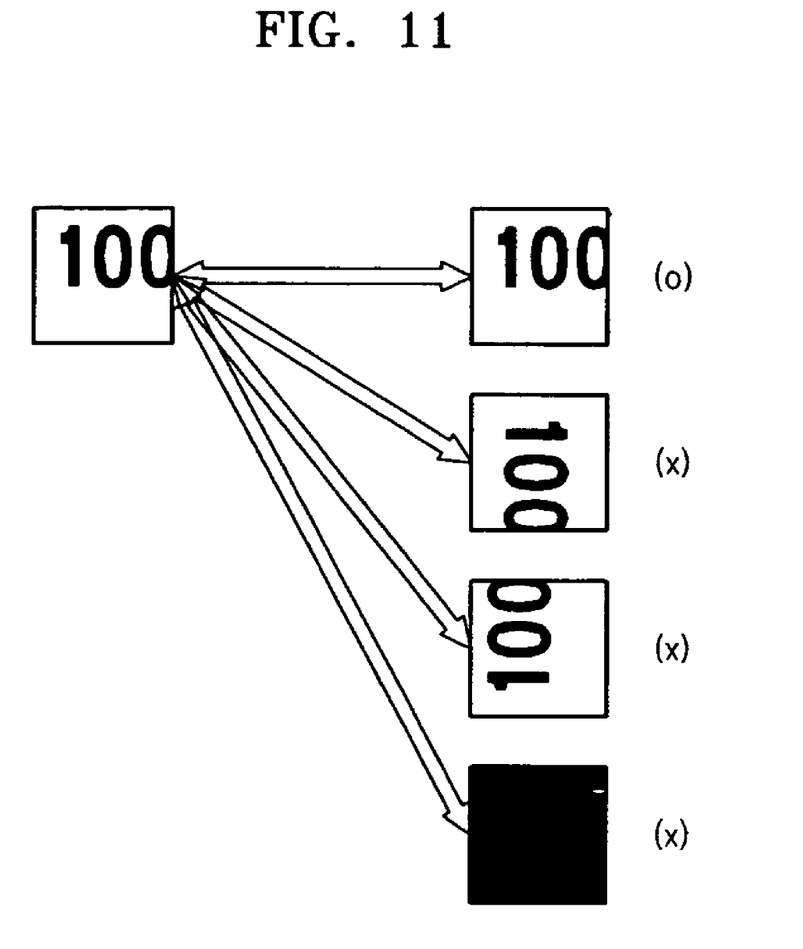
FIG. 11 illustrates a result of comparing the edge image of the document with the comparative edge images of FIG. 10 by a pixel value comparing unit illustrated in FIG. 9.

FIG. 11 illustrates a result of comparing the edge image of the document with the comparative edge images of FIG. 10 by the pixel value comparing unit 420 illustrated in FIG. 9. Referring to FIG. 11, the comparative edge image that is analogous to the edge image detected by the edge image detecting unit 110 is indicated by "o" and the comparative edge images that are different from the detected edge image are represented by "x".

The document attribute determining unit 130 determines whether the document is the secure document according to the checked result of the similarity checking unit 120. For example, when the similarity checking unit 120 indicates that one of the comparative edge images is analogous to the edge image detected by the edge image detecting unit 110, the document attribute determining unit 130 determines that the input document is the secure document. When the similarity checking unit 120 indicates that none of the comparative edge images are analogous to the edge image detected by the edge image detecting unit 110, the document attribute determining unit 130 determines that the input document is not the secure document.

The image formation stop instructing unit 140 stops the formation of the document according to the result output by the document attribute determining unit 130. For example, when the document attribute determining unit 130 indicates that the input document is the secure document, the image formation stop instructing unit 140 stops the image formation of the document which is currently being performed. When the document attribute determining unit 130 indicates that the input document is not the secure document, the image formation stop instructing unit 140 allows the image formation of the document which is currently being performed to continue.

Hereinafter, a method of detecting a secure document according to an exemplary embodiment of the present invention will be described in detail with reference to the accompanying drawings.

Figure 12:
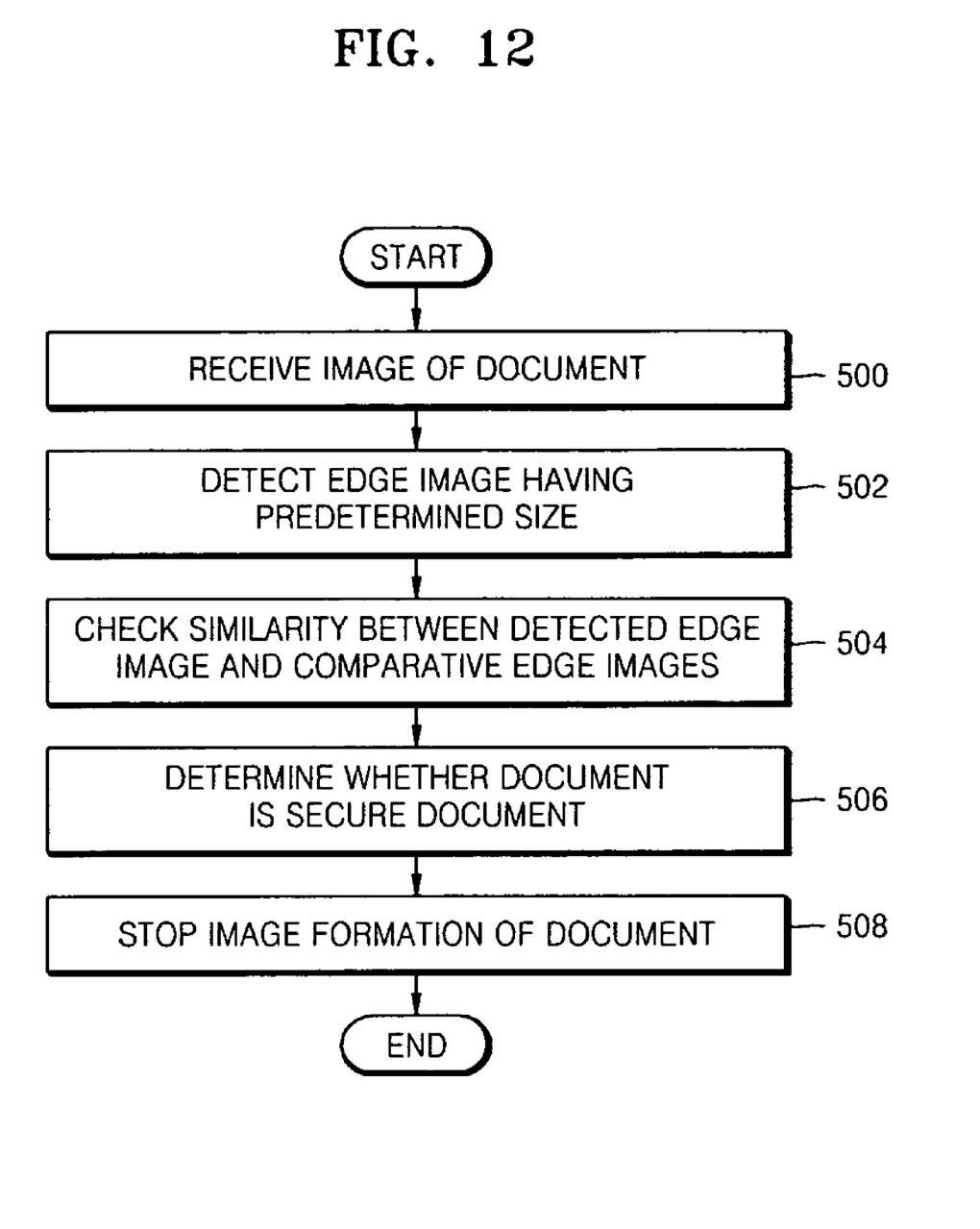
FIG. 12 is a flowchart illustrating a method of detecting a secure document according to an exemplary embodiment of the present invention.

FIG. 12 is a flowchart illustrating a method of detecting a secure document according to an exemplary embodiment of the present invention.

First, the image of a document is received (operation 500).

Figure 13:
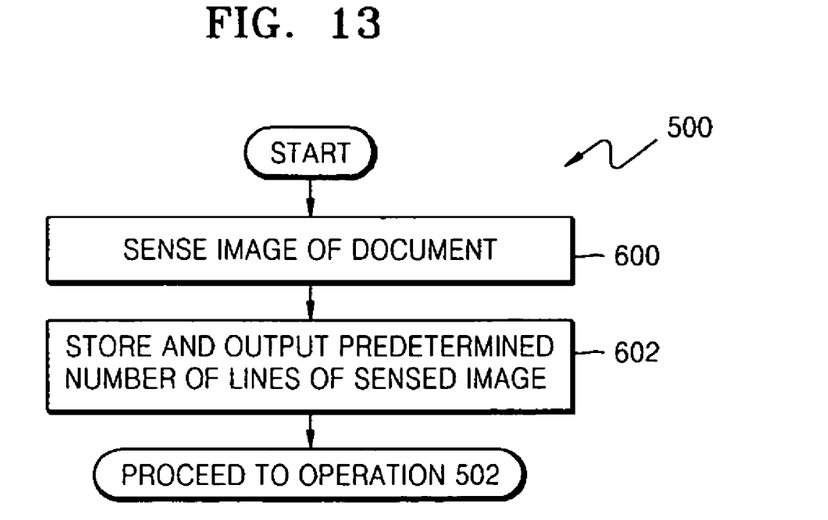
FIG. 13 is a flowchart illustrating operation 500 illustrated in FIG. 12.

FIG. 13 is a flowchart illustrating operation 500 illustrated in FIG. 12.

First, the image of the document is sensed (operation 600). In order to sense the image of the document, a CCD image sensor or a CMOS image sensor (also referred to as a CIS) is used.

After operation 600, a predetermined number of lines of the sensed image are stored and then output (operation 602). The predetermined number of lines is the number of lines of an image including an edge image that can be detected in operation 502. To detect the edge image, the edge image may need to have a predetermined size.

After operation 500, the edge image of the document having the predetermined size is detected (operation 502).

Figure 14:
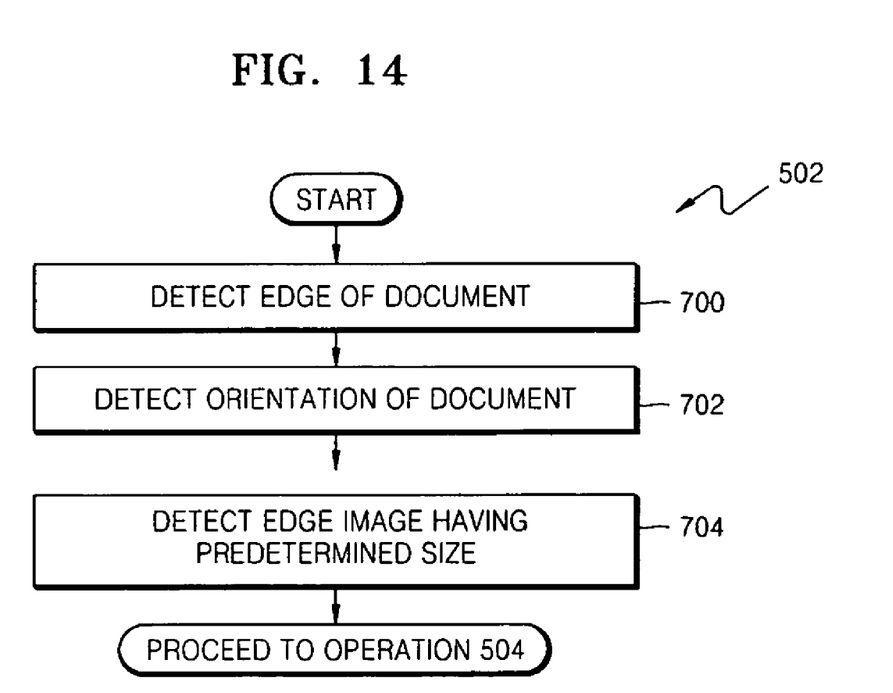
FIG. 14 is a flowchart illustrating operation 502 illustrated in FIG. 12.

FIG. 14 is a flowchart illustrating operation 502 illustrated in FIG. 12.

First, an edge of the document is detected (operation 700).

After operation 700, the orientation of the document is detected using the image of the detected edge (operation 702).

After operation 702, the edge image having the predetermined size is detected using the detected orientation (operation 704). FIG. 5 illustrates an example of detecting the edge image of the paper money illustrated in FIG. 4.

After operation 502, the similarity between the detected edge image and comparative edge images corresponding of the image formation documents which are previously stored is checked (operation 504).

The comparative edge images of the secure documents are rearranged and stored with a predetermined orientation.

Figure 15:
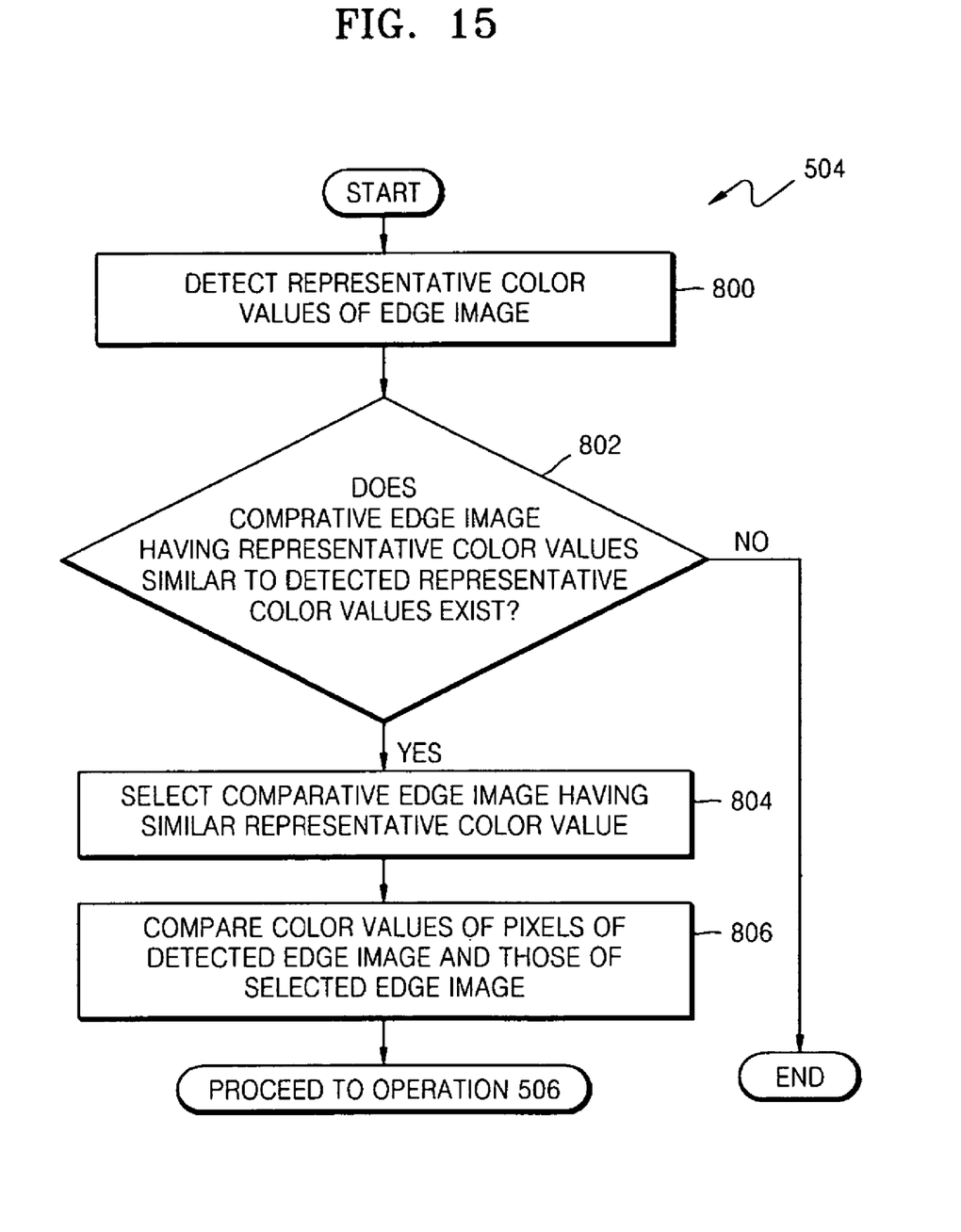
FIG. 15 is a flowchart illustrating operation 504 illustrated in FIG. 12.

FIG. 15 is a flowchart illustrating operation 504 illustrated in FIG. 12.

First, representative color values of the detected edge image are detected (operation 800).

In operation 800, first red, green, and blue values obtained by averaging the respective pixel values of the detected edge images are detected as the representative color values.

Alternatively, in operation 800, a second red, green, and blue value occurring with a maximum frequency among the respective pixel values of the detected edge images are detected as the representative color values.

On the other hand, in operation 800, third red, green, and blue values corresponding to a median of the respective pixel values of the detected edge image are detected as the representative color values.

After operation 800, a determination is made as to whether one of the comparative edge images has representative color values similar to those of the detected edge image (operation 802).

In operation 802, the absolute values of the respective differences between the first red, green, and blue values, and first comparative red, green, and blue values corresponding to the representative color values of any one of the comparative images are compared with first, second, and third threshold values, respectively.

Alternatively, in operation 802, the sum of the absolute values of the respective differences between the first red, green, and blue values, and the first comparative red, green, and blue values corresponding to the representative color values of any one of the comparative images are compared with a fourth threshold value.

On the other hand, in operation 802, the absolute values of the respective differences between the second red, green, and blue values, and second comparative red, green, and blue values corresponding to the representative color values of any one of the comparative images are compared with fifth, sixth, and seventh threshold values, respectively.

The sum of the absolute values of the respective differences between the second red, green, and blue values, and the second comparative red, green, and blue values are compared with an eighth threshold value.

Alternatively, in operation 802, the absolute values of the respective differences between the third red, green, and blue values corresponding to the representative color values of any one of the comparative images are compared with ninth, tenth, and eleventh threshold values, respectively.

On the other hand, in operation 802, the sum of the absolute values of the respective differences between the third red, green, and blue values, and the third comparative red, green, and blue values are compared with a twelfth threshold value.

If a comparative edge image having representative color values similar to the detected representative color values exists, the comparative edge image having the similar representative color values is selected (operation 804).

After operation 804, the color values of the pixels of the selected comparative edge image are compared with those of the detected edge image (operation 806). The color values of the bitmap of the selected comparative edge image are compared with those of the detected edge image in the pixel unit.

After operation 504, a determination is made as to whether the document is the secure document according to the similarity checking result (operation 506). When one of the comparative edge images is analogous to the detected edge image, it is determined that the input document is the secure document. When none of the comparative edge images is analogous to the detected edge image, it is determined that the input document is not the secure document.

After operation 506, when it is determined that the input document is the secure document, the image formation of the document is stopped (operation 508). That is, when it is determined that the input document is the secure document, the image formation of the document which is currently being performed is stopped. On the other hand, when it is determined that the input document is not the secure document, the image formation of the document, which is currently being performed, is allowed to continue.

Exemplary implementations of the present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the exemplary embodiments of the present invention can be easily construed by programmers skilled in the art to which the present invention pertains.

In an apparatus and method of detecting a secure document according to an exemplary embodiment of the present invention, a quick determination can be made as to whether an input document is a secure document.

In an apparatus and method of detecting a secure document according to an exemplary embodiment of the present invention, a time delay required for forming an image can be minimized by rapidly determining whether an input document is a secure document.

While the present invention has been shown and described with reference to certain exemplary embodiments thereof, it will be understood by those of ordinary skill in the art that various changes in form and details may be made therein without departing from the spirit and scope of the present invention as defined by the following claims and their equivalents.

What is claimed is:

1. An apparatus for detecting a secure document, comprising:
   an image input unit for receiving an image of a document;
   an edge image detecting unit for detecting a corner image of the document;
   an orientation detecting unit for calculating an orientation of the document using the image including the detected corner;
   an image detecting unit for detecting a corner image of a predetermined size by using the detected orientation;
   a similarity checking unit for checking the similarity between the detected corner image and previously stored comparative corner images of secure documents; and
   a document attribute determining unit for determining whether the document is one of the secure documents according to a result of the similarity checking,
   wherein the previously stored comparative corner images are rearranged and stored in a number of predetermined orientations,
   wherein the similarity checking unit comprises:
   a color value detecting unit for detecting the representative color values of the detected corner image;
   a color value comparing unit for comparing the detected representative color values of the corner image with the representative color values of the comparative corner images and selecting a comparative corner image that have representative color values similar to the detected representative color values of the corner image; and
   a pixel value comparing unit for comparing color values of the pixels of the detected corner image with color values of the pixels of the selected comparative image according to a result of the color value comparing.

2. The apparatus of claim 1, wherein the image input unit comprises:
   an image sensing unit for sensing the image of the document; and
   a buffering unit for storing a number of lines of the sensed image and outputting the sensed image to the edge image detecting unit.

3. The apparatus of claim 1, wherein the color value detecting unit detects at least one of a first red value obtained by averaging the red pixel values of the detected edge image, a first green value obtained by averaging the green pixel values of the detected edge image, and a first blue value obtained by averaging the blue pixel values of the detected edge image as the representative color values.

4. The apparatus of claim 3, wherein the color value comparing unit compares absolute values of the respective differences between at lest one of the first red value, the first green value and the first blue value, and at least one of a first comparative red value, a first comparative green value and a first comparative blue value as the representative color values of at least one of the comparative edge images with first, second, and third threshold values, respectively.

5. The apparatus of claim 3, wherein the color value comparing unit compares a sum of the absolute values of the respective differences between at least one of the first red value, the first green value and the first blue value, and at least one of a first comparative red value, a first comparative green value and a first comparative blue value as the representative color values of at least one of the comparative edge images with a fourth threshold value.

6. The apparatus of claim 1, wherein the color value detecting unit detects at least one of a second red value occurring with a maximum frequency among red pixel values of the detected edge image, a second green value occurring with a maximum frequency among the green pixel values of the detected edge image, and a second blue value occurring with a maximum frequency among the blue pixel values of the detected edge image as the representative color values.

7. The apparatus of claim 6, wherein the color value comparing unit compares the absolute values of the respective differences between at least one of the second red value, the second green value and the second blue value, and at least one of a second comparative red value, a second comparative green value and a second comparative blue value as the representative color values of at least one of the comparative edge images with fifth, sixth, and seventh threshold values, respectively.

8. The apparatus of claim 6, wherein the color value comparing unit compares the sum of the absolute values of the respective differences between at least one of the second red value, the second green value and the second blue value, and at least one of a second comparative red value, a second comparative green value and a second comparative blue value as the representative color values of at least one of the comparative edge images with an eighth threshold value.

9. The apparatus of claim 1, wherein the color value detecting unit detects at least one of a third red value corresponding to a median of the red pixel values of the detected edge image, a third green value corresponding to a median of the green pixel values of the detected edge image, and a third blue value corresponding to a median of the blue pixel values of the detected edge image as the representative color values.

10. The apparatus of claim 9, wherein the color value comparing unit compares the absolute values of the respective differences between at least one of the third red value, the third green value and the third blue value, and at least one of a third comparative red value, a third comparative green value and a third comparative blue value as the representative color values of at least one of the comparative edge images with ninth, tenth, and eleventh threshold values, respectively.

11. The apparatus of claim 9, wherein the color value comparing unit compares the sum of the absolute values of the respective differences between at least one of the third red value, the third green value and the third blue value, and at least one of a third comparative red value, a third comparative green value and a third comparative blue value as the representative color values of at least one of the comparative edge images with a twelfth threshold value.

12. The apparatus of claim 1, further comprising:
an image formation stop instructing unit which stops the formation of the document according to the result of the document attribute determining unit.

13. The apparatus of claim 1, wherein the secure document is paper money.

14. A method of detecting a secure document, comprising:
receiving an image of a document;
detecting a corner image of the document;
calculating an orientation of the document using the image including the detected corner:
detecting a corner image of a predetermined size by using the detected orientation;
checking a similarity between the detected corner image and comparative corner images of secure documents which are previously stored; and
determining whether the document is one of the secure documents according to the similarity,
wherein at least one programmed controller performs at least one of the receiving step, the detecting step, the calculating step, the detecting step, the checking step and the determining step,
wherein the comparative edge images are rearranged and stored in a number of predetermined orientations,
wherein the checking of the similarity between the detected corner image and the comparative corner images comprises:
detecting representative color values of the detected corner image;
checking to determine whether at least one of the comparative corner images comprises representative color values similar to the representative color values of the detected corner image;
selecting a comparative corner image comprising the representative color values similar to the representative color values of the detected corner image; and comparing color values of the pixels of the detected corner image with color values of the pixels of the selected comparative corner image.

15. The method of claim 14, wherein the receiving of the image of the document comprises:
sensing the image of the document; and
storing and outputting a number of lines of the sensed image.

16. The method of claim 14, wherein the detecting of the representative color values of the detected edge image comprises detecting at least one of a first red value obtained by averaging the red pixel values of the detected edge image, a first green value obtained by averaging the green pixel values of the detected edge image, and a first blue value obtained by averaging the blue pixel values of the detected edge image as the representative color values.

17. The method of claim 16, wherein the selecting of the comparative edge image comprises comparing absolute values of the respective differences between at least one of the first red value, the first green value and the first blue value, and at least one of a first comparative red value, a first comparative green value and a first comparative blue value as the representative color values of at least one of the comparative edge images with first, second, and third threshold values, respectively.

18. The method of claim 17, wherein the selecting of the comparative edge image comprises comparing a sum of the absolute values of the respective differences between at least one of the first red value, the first green value and the first blue value, and at least one of a first comparative red value, a first comparative green value and a first comparative blue value as the representative color values of at least one of the comparative edge images with a fourth threshold value.

19. The method of claim 14, wherein the detecting of representative color values of the detected edge image comprises detecting at least one of a second red value occurring with a maximum frequency among red pixel values of the detected edge image, a second green value occurring with a maximum frequency among the green pixel values of the detected edge image, and a second blue value occurring with a maximum frequency among the blue pixel values of the detected edge image as the representative color values.

20. The method of claim 19, wherein the selecting of the comparative edge image comprises comparing absolute values of the respective differences between at least one of the second red value, the second green value and the second blue value, and at least one of a second comparative red value, a second comparative green value and a second comparative blue value as the representative color values of at least one of the comparative edge images with fifth, sixth, and seventh threshold values, respectively.

21. The method of claim 20, wherein the selecting of the comparative edge image comprises comparing the sum of the absolute values of the respective differences between at least one of the second red value, the second green value, and the second blue value, and at least one of a second comparative red value, a second comparative green value and a second comparative blue value as the representative color values of at least one of the comparative edge images with an eighth threshold value.

22. The method of claim 19, wherein the detecting of representative color values of the detected edge image comprises detecting at least one of a third red value corresponding to a median of the red pixel values of the detected edge image, a third green value corresponding to a median of the green pixel values of the detected edge image, and a third blue value corresponding to a median of the blue pixel values of the detected edge image as the representative color values.

23. The method of claim 22, wherein the selecting of the comparative edge image comprises comparing absolute values of the respective differences between at least one of the third red value, the third green value and the third blue value, and at least one of a third comparative red value, a third comparative green value and a third comparative blue value as the representative color values of at least one of the comparative edge images with ninth, tenth, and eleventh threshold values, respectively.

24. The method of claim 22, wherein the selecting of the comparative edge image comprises comparing a sum of the absolute values of the respective differences between at least on of the third red value, the third green value and the third blue value, and at least one of a third comparative red value, a third comparative green value and a third comparative blue value as the representative color values of at least one of the comparative edge images with a twelfth threshold value.

25. The method of claim 14, further comprising:
stopping the image formation of the document if the document is determined to comprise the secure document.

26. The method of claim 14, wherein the secure document comprises paper money.

27. A non-transitory computer-readable medium comprising a computer program for performing the method of claim 14.

* * * * *